United States Patent Office 2,902,356
Patented Sept. 1, 1959

2,902,356
CERTAIN 2-PHENYLIMINO, 3-ALKYL OXAZOLIDINES, COMPOSITIONS AND METHODS OF USE AS HERBICIDES

Raymond W. Luckenbaugh, Wilmington, Del., assignor to E. I. du Pont de Nemours and Company, Wilmington, Del., a corporation of Delaware No Drawing. Application May 16, 1956
Serial No. 585,176

5 Claims. (Cl. 71—2.5)

This invention relates to a class of 2-phenylimino-3-alkyloxazolidines, and to herbicidal compositions and methods employing these novel compounds.

The phenylimino-alkyl-oxazolidines that have been found to possess outstanding herbicidal activity are those represented by the following formula (1)

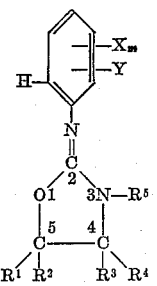

wherein X and Y are selected from the group consisting of hydrogen, halogen, and alkyl groups containing less than 5 carbon atoms; $m$ is a positive integer less than 4, that is 1, 2 or 3; $R^1$, $R^2$, $R^3$ and $R^4$ are selected from the group consisting of hydrogen and methyl; and $R^5$ is an alkyl group containing less than 5 carbon atoms. $R^5$ is preferably methyl.

X and Y in Formula 1 above preferably are hydrogen or chlorine. Where the phenyl ring is substituted with 1 or more chlorines, the most preferred compounds are those in which there is chlorine on the para position of the benzene nucleus.

The oxazolidines of the present invention can be prepared in accordance with the following series of reactions. While specific compounds are set forth in these reactions for illustration purposes, it is to be understood that any of the compounds of Formula 1 can be prepared by this route using appropriate reactants.

(2)

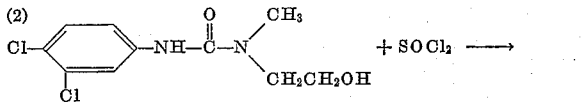

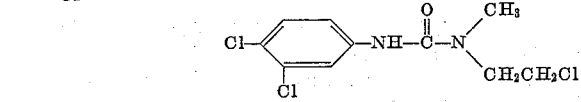

(3)

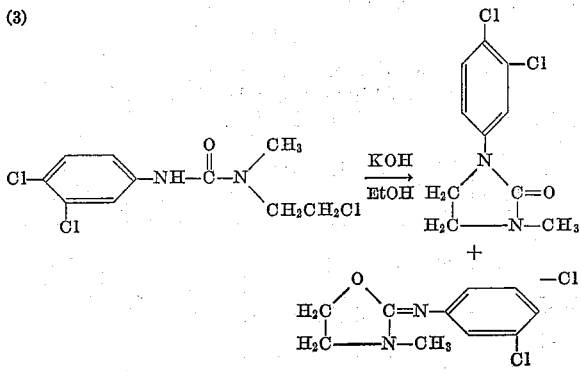

The phenyl hydroxyethyl methylureas employed in Equation 2 can be prepared in accordance with the procedure set forth in Searle and Todd U.S. Patent No. 2,663,729.

The reaction of Equation 2 can be carried out advantageously by first preparing a slurry of the substituted urea in an inert solvent such as benzene, toluene, xylene, dioxane, or ether, and then adding dropwise to the reaction mixture at room temperature a slight excess of an equimolar quantity of thionyl chloride. The rate of addition of the thionyl chloride and the temperature of the reaction mass are not critical, although 20–40° C. appears to give optimum results.

The reaction mixture is stirred or heated until hydrogen chloride evolution practically ceases. The solvent is then removed, such as by evaporation in vacuum on a steam bath, yielding in essentially pure form the phenyl chloroethyl methylurea intermediate reaction product of Equation 2.

In place of the thionyl chloride, other conventional reagents for converting an alcohol to an alkyl halide can be used in the reaction of Equation 2. For example, zinc chloride and hydrochloric acid, phosphorus halides in pyridine, aqueous hydrobromic acid together with sulfuric acid, and the action of potassium or sodium iodide and phosphoric acid are suitable for this purpose.

In carrying out the reaction of Equation 3, the phenyl haloethyl methylurea intermediate prepared in accordance with Equation 2 is dissolved in alcohol and added rapidly to an equimolar quantity of potassium hydroxide dissolved in alcohol. This mixture is refluxed for several hours.

The two heterocyclic isomers prepared in accordance with Equation 3 can be separated by cooling the reaction mixture to about 0–5° C. and filtering. The imidazolidinone precipitates and is removed by the filtration. The oxazolidine can be separated from the filtrate by cooling to a lower temperature. Alternatively, these isomers can be separated by an alcohol extraction of the reaction product, since the oxazolidines are more soluble in alcohol than are the imidazolidinones.

Other solvents or alkaline condensing agents can be used when carrying out the reaction of Equation 3. For example, such solvents as methanol, isopropanol, and methylal; and such alkaline condensing agents as sodium hydroxide and triethylamine can be employed.

The oxazolidines of the present invention are low melting crystalline solids or oils that are characterized by low solubility in water. Illustrative of the compounds of the invention represented by Formula 1 above are the following:

(1)  2-phenylimino-3-methyloxazolidine
(2)  2-(p-chlorophenylimino)-3-methyloxazolidine
(3)  2-(3,4-dichlorophenylimino)-3-methyloxazolidine
(4)  2 - (2,4,5-trichlorophenylimino)-3-methyloxazolidine
(5)  2-(p-tolylimino)-3-methyloxazolidine
(6)  2-(p-isopropylphenylimino)-3-methyloxazolidine
(7)  2-(p-sec.butylphenylimino)-3-methyloxazolidine
(8)  2-(p-bromophenylimino)-3-methyloxazolidine
(9)  2-(p-iodophenylimino)-3-methyloxazolidine
(10) 2-(p-fluorophenylimino)-3-methyloxazolidine
(11) 2-(3,4-dimethylphenylimino)-3-methyloxazolidine
(12) 2-(3-chloro-4-tolylimino)-3-methyloxazolidine
(13) 2 - (3-chloro - 4-isopropylphenylimino)-3-methyloxazolidine
(14) 2 - (3,4-dichlorophenylimino)-3,5-dimethyloxazolidine
(15) 2-(3,4-dichlorophenylimino)-3,4,5-trimethyloxazolidine

(16) 2 - (3,4 - dichlorophenylimino)-3,5,5-trimethyloxazolidine
(17) 2 - (3,4-dichlorophenylimino)-3,4,5,5-tetramethyloxazolidine
(18) 2-(p-chlorophenylimino)-1-ethyloxazolidine
(19) 2-(3,4-dichlorophenylimino)-3-isopropyloxazolidine
(20) 2-(3,4-dichlorophenylimino)-3-butyloxazolidine
(21) 2-(p-isopropylphenylimino)-3-ethyloxazolidine
(22) 2-(p-isopropylphenylimino)-3-n-propyloxazolidine
(23) 2-(phenylimino)-3,4-dimethyloxazolidine In order to utilize the herbicidal activity of the compounds of the invention to best advantage, they are formulated by admixture with a carrier material or conditioning agent of the kind used and referred to in the art as a pest control adjuvant or modifier. This provides formulations adapted for ready and efficient application to soil, weeds, or unwanted plants using conventional applicator equipment. Thus, the herbicidal compositions of the invention are in the form of solutions, dusts, water dispersible powders, aqueous dispersions, and emulsions.

Pest control adjuvants such as dusts, solvents, wetting, dispersing and emulsifying agents set out in U.S. Patent 2,426,417 can be employed in preparing the herbicidal compositions of the present invention. Other wetting, dispersing, and emulsifying agents such as those listed in detail in Bulletin E 607 of the Bureau of Entomology and Plant Quarantine of the U.S. Department of Agriculture, and such as those set out in an article by McCutcheon in Chemical Industries, November 1947, page 811, entitled "Synthetic Detergents" can also be used. The preferred herbicidal compositions of the present invention are in the form of water dispersible powders. These can be prepared by admixing one or more of the substituted oxazolidines with a surface-active dispersing agent and a finely divided solid carrier or dust such as talc, pyrophyllite, natural clays, diatomaceous earths and other powdered diluents such as those set out in the aforementioned U.S. patent. The surface-active dispersing agent is used in amount sufficient to impart water dispersibility to the powder. Dust compositions can be prepared by mixing one or more of the substituted oxazolidines with a finely divided carrier such as those set forth in the aforementioned U.S. patent.

Liquid herbicidal compositions can be prepared by intimately dispersing one or more of the substituted oxazolidines in a conventional liquid herbicidal carrier, such as water or a herbicidal oil. For example, effective liquid compositions can be prepared by vigorously milling together a herbicidal oil such as kerosene and a substituted oxazolidine. Such a liquid composition can be prepared in the form of a concentrate that can subsequently be extended with a herbicidal oil. If an emulsifier is included in the concentrate, it can also be extended to sprayable concentrations with water.

The content of substituted oxazolidines in the herbicidal compositions of the invention will vary according to the manner in which and the purpose for which the composition is to be applied but, in general, will be from 0.05 to 95% by weight of the composition.

The herbicidal method of the present invention comprises applying a substituted oxazolidine of Formula 1, ordinarily in a herbicidal composition of the aforementioned type, to the locus or area to be protected from undesirable plant growth. The active compound is, of course, applied in amount sufficient to exert the desired herbicidal action. The application can be made directly upon the locus or area and the vegetation thereon during the period of infestation, or, alternatively, the application can be made in advance of an anticipated weed infestation.

When applied as a foliar spray ordinarily a dosage of 10 to 60 pounds per acre will be used. When applied to the soil as a pre-emergence treatment, a dosage of about 4 to 20 usually is employed.

The preferred method is to apply the substituted oxazolidines directly to the soil prior to weed infestation, that is, as a pre-emergence treatment. When used in this way it may be desirable to include other soil pesticides, such as soil fungicides and nematocides. Also, it may be desirable to include a fertilizer material in these compositions.

In order that the invention can be better understood, the following examples are given in addition to those set forth above:

*Example 1*

19.6 parts by weight of thionyl chloride is added dropwise over a period of 30 minutes to a mixture of 29.1 parts by weight of 1-(2-hydroxyethyl)-1-methyl-3-phenylurea and 200 parts by weight of benzene. The reaction is slightly exothermic and hydrogen chloride is evolved. After refluxing on a steam bath for 4 hours, hydrogen chloride evolution practically ceases. 1-(2-chloroethyl)-1-methyl-3-phenylurea is isolated by evaporation of the solvent as a viscous semi-solid, giving a 76% yield.

*Analysis.*—Calcd. for $C_{10}H_{13}ClN_2O$: N, 13.2; Cl, 16.7. Found: N, 13.13, 13.26; Cl, 17.41.

A sample of this impure substituted urea is then purified by crystallizing from ethanol-water to yield essentially pure crystalline 1-(2-chloroethyl)-1-methyl-3-phenylurea having a melting point of 99–100° C.

*Analysis.*—Calcd. for $C_{10}H_{13}ClN_2O$: N, 13.2; Cl, 16.7. Found: N, 13.20; Cl, 16.27, 16.17.

21.3 parts by weight of 1-(2-chloroethyl)-1-methyl-3-phenylurea is added gradually to a solution of potassium hydroxide containing 6.6 parts by weight of 85% potassium hydroxide in 125 parts of ethanol. The mixture is stirred and refluxed for two hours. The hot solution is filtered from the potassium chloride, and on cooling, 1-methyl-3-phenyl-2-imidazolidinone, 10.5 parts by weight, precipitates from the filtrate.

*Analysis.*—Calcd. for $C_{10}H_{12}N_2O$: N, 15.9. Found: N, 15.81, 15.66.

After the imidazolidinone is removed from the reaction mass by filtration, the filtrate is diluted with a large volume of water. 2 - phenylimino - 3 - methyloxazolidine separates and is isolated by extraction with methylene dichloride, followed by evaporation of the solvent.

This compound is formulated into a wettable powder of the following composition by combining the dry components, blending in a ribbon blender, micropulverizing in a hammer mill until substantially all of the product is below 50 microns in particle size and reblending the product in a ribbon blender:

| | Percent |
|---|---|
| 2-phenylimino-3-methyloxazolidine | 50 |
| Dry synthetic calcium silicate ("Micro-cel" 805) | 48 |
| Alkyl aryl sulfonate | 1.75 |
| Methyl cellulose | 0.25 |

When applied at a rate of 40 lbs./acre of active ingredient, this composition gives excellent control of an assortment of weeds such as broomsedge, crabgrass, yellow fox tail, annual ragweed and quack grass.

*Example 2*

A mixture consisting of 60.0 parts by weight of 3-(3,4-dichlorophenyl)-1-(2-hydroxyethyl) - 1 - methylurea and 400 parts by weight of benzene is treated with 29.8 parts by weight of thionyl chloride in accordance with the procedure of Example 1. Crude 1-(2-chloroethyl)-3-(3,4-dichlorophenyl)-1-methylurea, 54.5 parts by weight, is isolated as a brown solid by evaporation of the benzene solvent.

A part of this crude solid is recrystallized from ethanol-water to give essentially pure 1-(2-chloroethyl)-3-(3,4-dichlorophenyl)-1-methylurea having a melting point of 91–92° C.

*Analysis.*—Calcd. for $C_{10}H_{11}Cl_3N_2O$: N, 9.97; Cl, 37.9. Found: N, 9.98, 9.93; Cl, 36.79, 36.90.

54.5 parts by weight of the thusly prepared 1-(2-chloroethyl)-3-(3,4-dichlorophenyl)-1-methylurea is dissolved in 75 parts by weight of alcohol. This is added to a solution of 12.7 parts by weight of potassium hydroxide (85%) in 200 parts by weight of alcohol. The mixture is refluxed for two hours, cooled to 20° C., and filtered. Essentially pure 3-(3,4-dichlorophenyl)-1-methyl-2-imidazolidinone, 20 parts by weight, M.P. 157-157.5° C., is obtained after washing the potassium chloride from the precipitate with water.

After removing the imidazolidinone from the reaction mass by filtration, the filtrate is diluted with a large volume of water. 2-(3,4-dichlorophenylimino)-3-methyloxazolidine separates from the solution, and is removed by filtration. After the product is air dried, there is obtained 12 parts by weight of 2-(3,4-dichlorophenylimino)-3-methyloxazolidine melting at 45–47° C.

*Analysis.*—Calcd. for $C_{10}H_{10}Cl_2N_2O$: C, 48.0; H, 4.08; Cl 29.0; N, 11.4. Found: C, 49.23, 49.10, 49.66; H, 4.22, 4.05, 4.39; N, 11.30, 11.06; Cl, 28.28.

The thusly prepared substituted oxazolidine is then formulated into the following dust herbicidal composition by mixing the active component with the adsorptive diluent, micropulverizing the mixture, and then extending the mixture with the principal diluent followed by blending in a ribbon blender:

| | Percent |
|---|---|
| 2-(3,4-dichlorophenylimino)-3-methyloxazolidine | 10 |
| Synthetic silica ("Hi-Sil") | 10 |
| Talc | 80 |

This herbicidal composition is then dusted by hand on the ground around a warehouse at a rate of 50 pounds per acre of the active ingredient. This treatment gives excellent weed control in the area.

A second sample of this oxazolidine is formulated into the following oil formulation:

| | Percent |
|---|---|
| 2-(3,4-dichlorophenylimino)-3-methyloxazolidine | 25 |
| Mixed alkylated naphthalenes (mainly α-methyl naphthalene) | 70 |
| Alkyl aryl polyether alcohol ("Triton" X155) | 5 |

These mutually soluble components are stirred together until a homogeneous solution results. The solution can be emulsified in water and diluted to use concentration or it can be diluted with a herbicidal oil such as Diesel oil and sprayed directly.

*Example 3*

24.7 parts by weight of 1-(2-chloroethyl)-3-(p-chlorophenyl)-1-methylurea is dissolved in 75 parts by weight of ethanol. This is added to a solution of 6.6 parts by weight of potassium hydroxide (85%) in 200 parts of ethanol.

The mixture is refluxed for two hours, cooled to 20° and filtered, removing the imidazolidinone reaction product.

The filtrate is further cooled using a Dry Ice-acetone bath. Essentially pure 2-(p-chlorophenylimino)-3-methyloxazolidine separates from the solution and is removed by filtration.

The thusly prepared substituted oxazolidine is formulated into the following dust herbicidal composition in accordance with procedure of Example 2:

| | Percent |
|---|---|
| 2-(p-chlorophenylimino)-3-methyloxazolidine | 20 |
| Diatomaceous silica ("Celite" 209) | 30 |
| Pyrophyllite | 50 |

This herbicidal composition is then dusted by hand on a tennis court at a rate of 60 pounds/acre of the active ingredient. This treatment destroys the weeds growing on the tennis court and prevents the growth of new weeds for a prolonged time.

*Example 4*

31 parts by weight of thionyl chloride is added dropwise over a period of 15 minutes to a mixture of 65 parts by weight of 3-(3,4-dichlorophenyl)-1-ethyl-1-(2-hydroxyethyl)urea and 500 parts of toluene. The mixture is let stand several days at room temperature, during which time an oily layer forms on the bottom of the vessel. The oily bottom layer is then separated and the toluene removed by evaporation. The resulting 1-(2-chloroethyl)-3-(3,4-dichlorophenyl) - 1 - ethylurea (61 parts) is a viscous yellow oil, $n_D^{25}$ 1.5885.

The oil is dissolved in 80 parts of ethanol. To this solution there is added 13.4 parts of 85% potassium hydroxide in 200 parts of ethanol. The mixture is stirred and refluxed for two hours. The hot solution is filtered from the potassium chloride. On cooling the imidazolidinone separates and is removed by filtration. On further cooling of the filtrate with a Dry Ice-acetone solution, 2-(3,4-dichlorophenylimino)-3-ethyloxazolidine separates, and is removed by filtration. The product is air dried. There is obtained 17 parts by weight melting at 54–56° C.

*Analysis.*—Calcd. for $C_{11}H_{12}Cl_2N_2O$: N, 10.8; Cl, 27.4. Found: N, 10.75, 10.90; Cl, 27.06, 26.75.

This substituted oxazolidine is then formulated into the following pellet herbicidal composition by intimately mixing the components with a very small amount of water in a ribbon blender and extruding the resulting paste under high pressure through a 1/16-inch diameter die and cutting the extruded "worms" into 1/4-inch lengths:

| | Percent |
|---|---|
| 2-(3,4-dichlorophenylimino)-3-ethyloxazolidine | 25 |
| Anhydrous sodium sulfate | 10 |
| Non-gelling kaolin clay | 65 |

*Examples 5 to 17*

The following substituted oxazolidines are in accordance with the procedure of Example 3 by substituting the listed amounts of 2-chloroethylureas for the 24.7 parts of 1-(2-chloroethyl)-3-(p-chlorophenyl)-1-methylurea in Example 3:

| Example No. | Product | Urea Reactant | Amts., Parts by Weight |
|---|---|---|---|
| 5 | 2-(2,4,5-trichlorophenylimino)-3-methyloxazolidine. | 1-(2-chloroethyl)-1-methyl-3-(2,4,5-trichlorophenyl)urea. | 31.6 |
| 6 | 2-(p-isopropylphenylimino)-3-methyloxazolidine. | 1-(2-chloroethyl)-3-(p-cumenyl)-1-methylurea. | 25.5 |
| 7 | 2-(p-bromophenylimino)-3-methyloxazolidine. | 3-(p-bromophenyl)-1-(2-chloroethyl)-1-methylurea. | 24.7 |
| 8 | 2-(3,4-dimethylphenylimino)-3-methyloxazolidine. | 1-(2-chloroethyl)-1-methyl-3-(3,4-xylyl)urea. | 24.1 |
| 9 | 2-(3-chloro-4-isopropylphenylimino)-3-methyloxazolidine. | 3-(3-chloro-p-cumenyl)-1-(2-chloroethyl)-1-methylurea. | 28.9 |
| 10 | 2-phenylimino-3,4-dimethyloxazolidine. | 1-(2-chloro-1-methylethyl)-1-methyl-3-phenylurea. | 22.6 |
| 11 | 2-(3,4-dichlorophenylimino)-3,5-dimethyloxazolidine. | 1-(2-chloropropyl)-3-(3,4-dichlorophenyl)-1-methylurea. | 29.6 |
| 12 | 2-(p-fluorophenylimino)-3-ethyl-4,5-dimethyloxazolidine. | 1-(2-chloro-1-methylpropyl)-1-ethyl-3-(p-fluorophenyl)urea. | 27.3 |
| 13 | 2-(p-iodophenylimino)-3,4,5-trimethyloxazolidine. | 1-(2-chloro-1-methylpropyl)-3-(p-iodophenyl)-1-methylurea. | 36.7 |
| 14 | 2-(ortho-ethylphenylimino)-3,4,5,5-tetramethyloxazolidine. | 1-(2-chloro-1,2-dimethylpropyl)-3-(o-ethylphenyl)-1-methylurea. | 28.3 |
| 15 | 2-(p-n-butylphenylimino)-3-ethyloxazolidine. | 1-(p-n-butylphenyl)-3-(2-chloroethyl)-3-ethylurea. | 28.3 |
| 16 | 2-(3,4-dichlorophenylimino)-3-isopropyloxazolidine. | 1-(2-chloroethyl)-3-(3,4-dichlorophenyl)-1-isopropylurea. | 31.0 |
| 17 | 2-(3,4-dichlorophenylimino)-3-n-butyloxazolidine. | 1-(n-butyl)-1-(2-chloroethyl)-3-(3,4-dichlorophenyl)urea. | 32.4 |

Each of these substituted oxazolidines is formulated into a wettable powder herbicidal composition by combining the listed dry components, blending in a ribbon blender, micropulverizing in a hammer mill until substantially all of the product is below 50 microns in particle size and reblending the product in a ribbon blender to give the following compositions:

|  | Percent |
|---|---|
| Substituted oxazolidine | 50 |
| Synthetic calcium silicate ("Microcel" 805) | 48.25 |
| Alkyl aryl sulfonate | 1.50 |
| Methyl cellulose | 0.25 |

These wettable powder herbicidal compositions when extended with water to form sprayable formulations containing 1% by weight of the active ingredient, and sprayed at a dosage of 50 lbs. per acre upon areas infested with Johnson grass, other perennial weeds and annual weeds, give excellent weed control.

*Example 17*

54.5 parts by weight of 1-(2-chloroethyl)-3-(3,4-dichlorophenyl)-1-methylurea is dissolved in 75 parts by weight of alcohol. This is added to a solution of 12.7 parts by weight of 85% potassium hydroxide in 200 parts by weight alcohol. The mixture is refluxed for two hours and the ethanol removed by evaporation.

The residue, comprising 2-(3,4-dichlorophenylimino)-3-methyloxazolidine and 3-(3,4-dichlorophenyl)-1-methyl-2-imidazolidinone, is washed with a little water to remove the potassium hydroxide, and is dried to give an extremely useful herbicidally active material.

This active material is formulated into a dust composition in accordance with the procedure of Example 3 by replacing the active ingredient of the composition of Example 3 with a like amount of this active material.

When applied to the ground along a railroad right of way at the rate of 50 pounds/acre of the active material, a quick kill of broadleaf and grassy weeds with prolonged soil sterility is obtained.

I claim:

1. A method for the control of undesired vegetation comprising applying to the locus to be treated, in an amount sufficient to exert herbicidal action, the compound represented by the formula

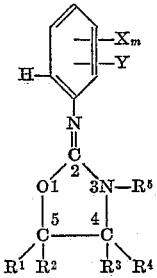

wherein X and Y are selected from the group consisting of hydrogen, halogen, and alkyl groups containing less than 5 carbon atoms; $m$ is a positive integer less than 4; $R^1$, $R^2$, $R^3$ and $R^4$ are selected from the group consisting of hydrogen and methyl; and $R^5$ is selected from the group consisting of alkyl radicals containing less than 5 carbon atoms.

2. A herbicidal composition comprising a herbicidal adjuvant, and in amount sufficient to exert herbicidal action, a compound represented by the formula

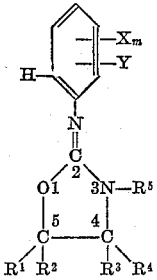

wherein X and Y are selected from the group consisting of hydrogen, halogen, and alkyl groups containing less than 5 carbon atoms; $m$ is a positive integer less than 4; $R^1$, $R^2$, $R^3$ and $R^4$ are selected from the group consisting of hydrogen and methyl; and $R^5$ is selected from the group consisting of alkyl radicals containing less than 5 carbon atoms.

3. A substituted oxazolidine represented by the formula

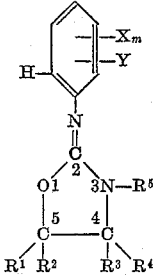

wherein X and Y are selected from the group consisting of hydrogen, halogen, and alkyl groups containing less than 5 carbon atoms; $m$ is a positive integer less than 4; $R^1$, $R^2$, $R^3$ and $R^4$ are selected from the group consisting of hydrogen and methyl; and $R^5$ is selected from the group consisting of alkyl radicals containing less than 5 carbon atoms.

4. A substituted oxazolidine as set forth in claim 3 wherein $R^5$ is methyl.

5. A substituted oxazolidine as set forth in claim 4 wherein Y is hydrogen and X is halogen.

References Cited in the file of this patent

UNITED STATES PATENTS

| 2,396,513 | Jones | Feb. 12, 1946 |

FOREIGN PATENTS

| 694,133 | Germany | July 26, 1940 |

OTHER REFERENCES

Agriculture Handbook, No. 69, page 250 (May 1954).